United States Patent
Mori et al.

(10) Patent No.: US 11,587,372 B2
(45) Date of Patent: Feb. 21, 2023

(54) ABNORMALITY DETECTION METHOD, ABNORMALITY DETECTION APPARATUS, AND ABNORMALITY DETECTION SYSTEM

(71) Applicant: DENSO CORPORATION, Kariya (JP)

(72) Inventors: Masataka Mori, Kariya (JP); Kenji Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 16/885,458

(22) Filed: May 28, 2020

(65) Prior Publication Data
US 2020/0380802 A1 Dec. 3, 2020

(30) Foreign Application Priority Data
May 30, 2019 (JP) .............................. JP2019-101236

(51) Int. Cl.
*G07C 5/08* (2006.01)
*B60W 50/00* (2006.01)

(52) U.S. Cl.
CPC ........... *G07C 5/0808* (2013.01); *B60W 50/00* (2013.01); *G07C 5/0816* (2013.01)

(58) Field of Classification Search
CPC .................................................. G07C 5/0808
See application file for complete search history.

(56) References Cited

U.S. PATENT DOCUMENTS

| | | | | |
|---|---|---|---|---|
| 10,013,877 B2* | 7/2018 | Lu | .................. | G08G 1/0112 |
| 10,026,240 B2* | 7/2018 | Ezawa | .................. | B61L 27/57 |
| 10,818,167 B2* | 10/2020 | Lu | .................. | G08G 1/096783 |
| 11,024,166 B2* | 6/2021 | Pellolio | .................. | G08G 1/0133 |
| 2017/0365166 A1 | 12/2017 | Lu et al. | | |
| 2018/0286225 A1 | 10/2018 | Lu et al. | | |
| 2019/0193741 A1* | 6/2019 | Hitomi | .................. | G08G 1/0129 |
| 2020/0380802 A1* | 12/2020 | Mori | .................. | B60W 50/00 |

FOREIGN PATENT DOCUMENTS

JP 2019022306 A 2/2019

OTHER PUBLICATIONS

Kazushi Ikeda, et al., Anomaly Detection of Roads from Driving Data Using a Statistical Discrepancy Measure, 2018 21st International Conference on Intelligent Transportation Systems (ITSC), Maui, Hawaii, USA, Nov. 4-7, 2018, pp. 2064-2067.

* cited by examiner

*Primary Examiner* — Michael A Berns
(74) *Attorney, Agent, or Firm* — Maschoff Brennan

(57) ABSTRACT

In an abnormality detection method for detecting an abnormality in vehicle behaviors based on an abnormality degree indicating a degree of difference between first driving information representing a vehicle behavior undergoing abnormality detection and second driving information obtained when no abnormality is found in a travel environment, an abnormality threshold is estimated using an abnormality degree distribution generated from a set of preaccumulated abnormality degrees. The abnormality threshold is an abnormality degree allowing a probability of erroneous determination as to presence or absence of an abnormality to be a predefined probability. Further, in the abnormality detection method, it is detected whether an abnormality is found in the vehicle behavior by comparing the abnormality degree for the first driving information and the estimated abnormality threshold.

13 Claims, 4 Drawing Sheets

ABNORMALITY DETECTION METHOD, ABNORMALITY DETECTION APPARATUS, AND ABNORMALITY DETECTION SYSTEM

CROSS-REFERENCE TO RELATED APPLICATION

This application is based on and claims the benefit of priority from earlier Japanese Patent Application No. 2019-101236 filed May 30, 2019, the description of which is incorporated herein by reference.

BACKGROUND

Technical Field

The present disclosure relates to a technique for detecting an abnormality in road conditions.

Related Art

An abnormality detection apparatus is known that, for each point through which vehicles travel, quantifies as an abnormality degree, a difference between a normal travelling behaviour of a vehicle and the vehicle behavior undergoing evaluation. If the abnormality degree is below a predefined threshold, the abnormality detection apparatus determines that the conditions of the road traveled by vehicles have no abnormality.

DESCRIPTION OF SPECIFIC EMBODIMENTS

Figure 1:
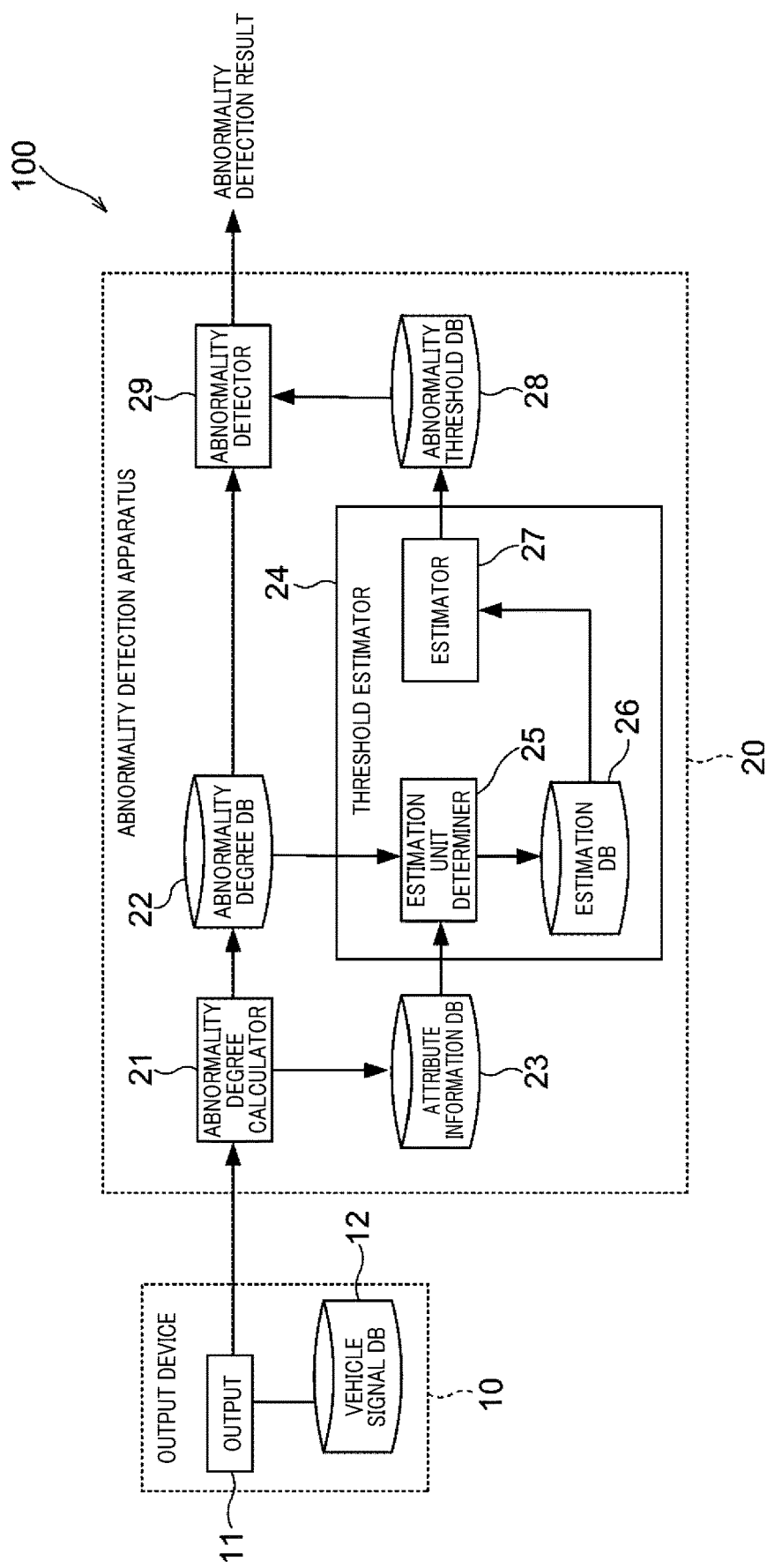
FIG. 1 illustrates an example configuration of an abnormality detection system.

As described in Kazushi Ikeda, Takatomi Kubo, Hiroaki Sasaki, Masataka Mori, Kentaro Hitomi, Kazuhito Takenaka, Kenji Muto, "Anomaly Detection of Roads from Driving Data Using a Statistical Discrepancy Measure," 2018 21st International Conference on Intelligent Transportation Systems (ITSC), Maui, Hi., 2018, pp. 2064-2067, when the abnormality detection apparatus determines whether the road traveled by vehicles has an abnormality by comparing the threshold and the abnormality degree representing the difference between the normal travelling behaviour of the vehicle and the vehicle behavior undergoing evaluation, a certain way of setting the threshold might lead to an erroneous determination that there is an abnormality although there is actually no abnormality. Thus, for the abnormality detection apparatus to have predetermined abnormality detection accuracy, the threshold needs to be set in association with the predetermined detection accuracy.

The relationship has been recently studied between the threshold and the detection accuracy. However, in actual situations, it is rare to satisfy a precondition for establishment of some relationship between the threshold and the detection accuracy. For this reason, users have set a threshold used in abnormality determination by experience or intuition without considering the relationship between the threshold and the abnormality detection accuracy, and it has been difficult to verify a probability that erroneous determination occurs.

In view of the foregoing, it is desired to have a technique that allows the accuracy of abnormality detection for vehicle behavior to more closely approximate predetermined detection accuracy as compared with techniques for detecting whether an abnormality is found in vehicle behavior by comparing the abnormality degree of the vehicle behavior estimated from driving information and a threshold set independently of a statistical method.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

As shown in FIG. 1, an abnormality detection system 100 includes an output device 10 and an abnormality detection apparatus 20. The output device 10 and the abnormality detection apparatus 20 are connected to each other via a communication line (not shown).

The output device 10 receives vehicle signals from vehicles and sends them to the abnormality detection apparatus 20. The vehicle signals represent traveling data sent from vehicles at predefined intervals and predefined times, and include driving information indicating vehicle behavior and attribute information about the travel environments of points through which vehicles travels (hereinafter simply referred to as points).

The driving information includes, for example, a vehicle speed, acceleration, a yaw angle, a roll angle, an operation amount of an accelerator pedal, an operation amount of a brake pedal, a steering angle, an operation speed of the accelerator pedal, an operation speed of the brake pedal, and a steering speed. That is, the driving information includes not only physical quantities representing vehicle behavior itself, but also physical quantities regarding the operations that are performed by a vehicle driver and cause vehicle behavior. Note that the driving information is not limited to the information listed above, and may include any information associated with vehicle behavior or vehicle operations. In contrast, the driving information may not necessarily include all the physical quantities mentioned above, but may include some of the physical quantities.

Each vehicle has various on-vehicle devices installed for obtaining attribute information and collects attribute information. The attribute information, which indicates the characteristics of a vehicle travel environment, is collected in association with the driving information.

The attribute information includes, for example, the characteristics of a road being traveled by a vehicle, traveling time information, traveling positional information, a captured road image, and traveling weather information.

The characteristics of a road are represented by road structure information and facility information. Examples of the road structure information include the number of traffic lanes, a curvature, the number of intersecting roads, the lengthwise distance to a road intersection, the speed limit, and the width. Examples of the road facility information include the presence or absence of a signal at an intersection, the presence or absence a median strip, the presence or absence of a sidewalk, and the presence or absence of a divider between the roadway and any sidewalk.

The time information includes a time (or a time period) and a day of the week.

Examples of the positional information include the vehicle latitude and longitude that are based on signals from a positioning system such as the global positioning system (GPS). The positional information may not necessarily be represented by a latitude or a longitude. For example, the positional information may be represented using a point identification (ID) uniquely set for each point through which vehicles travel.

The captured road image may be a road image captured by a vehicle traveling or a road image captured in advance as in a road picture database. The captured road image may be a road image captured from an aircraft. The captured road image may be of any type, such as a visible image, an infrared image, or a range image representing, in colors, the distances from the image capture point to subjects. The image may also be a moving image or a still image.

Examples of the weather information include the amount of rainfall, the amount of insolation, and weather estimated from the amount of rainfall and the amount of insolation (a category such as sunny, cloudy, rainy, or snowy weather).

The attribute information is not limited to the information listed above, and may include any information representing the characteristics of a vehicle travel environment. In contrast, the attribute information may not necessarily include all the information items mentioned above, but may include some of the information items. The items included in the attribute information and representing the characteristics of a vehicle travel environment are referred to as attributes.

A vehicle associates its driving information at each point with the attribute information at the point, and sends the resultant information to the output device 10 as a vehicle signal.

The output device 10 includes an output 11 and a vehicle signal database (DB) 12. The vehicle signal DB 12 receives vehicle signals from the vehicle and manages each vehicle signal.

In response to a request from the abnormality detection apparatus 20 for vehicle signals, the output 11 sends each vehicle signal managed in the vehicle signal DB 12 to the abnormality detection apparatus 20.

The abnormality detection apparatus 20 includes functional blocks and data storage areas. The functional blocks are an abnormality degree calculator 21, a threshold estimator 24, and an abnormality detector 29. The data storage areas are an abnormality degree DB 22, an attribute information DB 23, and an abnormality threshold DB 28.

The abnormality degree calculator 21 compares a reference data set prepared at each point and an evaluation data set for each point at which driving information is collected. The evaluation data set is obtained by assembling the driving information in vehicle signals from the output device 10 for each point at which the driving information is collected.

The reference data set is a set of driving information collected in a situation in which no abnormality is found in the travel environment. The evaluation data set is a set of driving information obtained when it is uncertain whether the travel environment has any abnormality. The reference data set corresponds to second driving information in the claims.

The expression "the travel environment has any abnormality" refers to a situation in which the road has a factor for obstructing vehicle traveling, such as an object fallen from a vehicle, road subsidence, road flooding, and a disabled vehicle that has been left.

When the travel environment has an abnormality, individual vehicle drivers intend to avoid the factor for obstructing vehicle traveling within the range of normal driving actions, and conduct driving such as changing lanes and lowering the vehicle speed, which is different from driving without any abnormality found in the travel environment.

That is, the evaluation data set received from the output device 10 and the reference data set at the point where the evaluation data set has been collected reflect the difference in the vehicle behavior depending on the presence or absence of an abnormality in the travel environment.

Accordingly, the comparison between the evaluation data set and the reference data set at the point where the evaluation data set has been collected enables the calculation of the abnormality degree of the vehicle behavior at the point where the evaluation data set has been collected (hereinafter simply referred to as the abnormality degree).

The abnormality degree is a value indicating the degree of difference between the vehicle behavior represented by the evaluation data set and the vehicle behavior with no abnormality found in the vehicle travel environment. In the present embodiment, as an example, a higher abnormality degree indicates a higher degree of difference from the vehicle behavior with no abnormality found in the vehicle travel environment.

As described above, when a vehicle travel environment has an abnormality, vehicles behave differently from when no abnormality is found in the travel environment, and the degree of difference increases. In other words, a higher abnormality degree indicates a higher probability that an abnormality has occurred in the travel environment at the point where each driving information item in the evaluation data set has been collected.

The abnormality degree calculator 21 calculates the abnormality degree at the point associated with an evaluation data set using the technique described in Kazushi Ikeda, Takatomi Kubo, Hiroaki Sasaki, Masataka Mori, Kentaro Hitomi, Kazuhito Takenaka, Kenji Muto, "Anomaly Detection of Roads from Driving Data Using a Statistical Discrepancy Measure," 2018 21st International Conference on Intelligent Transportation Systems (ITSC), Maui, Hi., 2018, pp. 2064-2067.

In an example, the abnormality degree calculator 21 estimates the dissimilarity between the probability distribution of the driving information in an evaluation data set and the probability distribution of the driving information in the reference data set based on two-sample U-statistics using a positive semidefinite kernel, and sets the estimated value as the abnormality degree. The abnormality degree calculator 21 then stores the calculated abnormality degree into the abnormality degree DB 22. The abnormality degree calculator 21 also stores into the attribute information DB 23, each attribute information item associated with the driving information used in the calculation of the abnormality degree.

Figure 2:
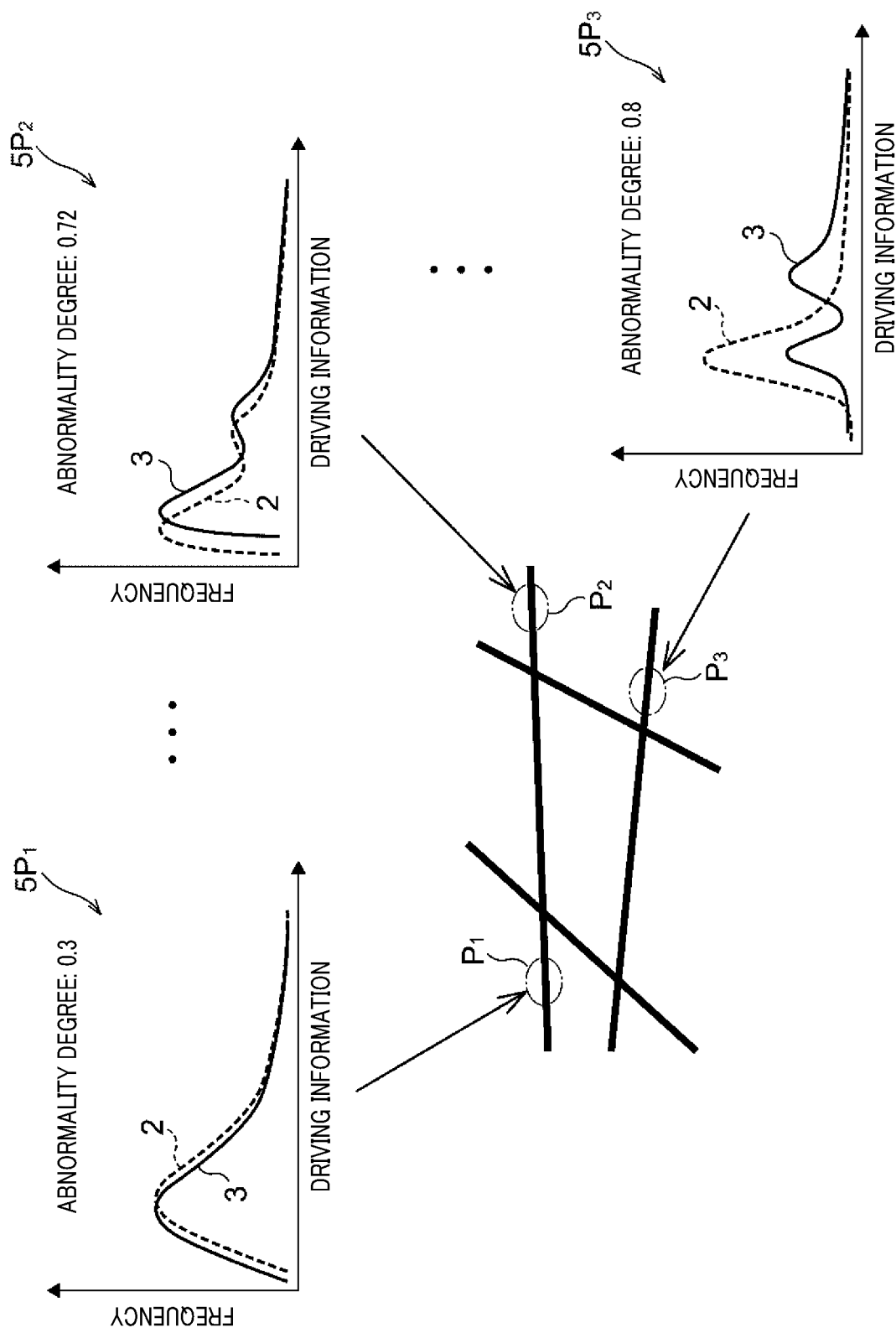
FIG. 2 illustrates example calculation of abnormality degrees.

FIG. 2 illustrates an example in which the abnormality degree calculator 21 calculates the abnormality degrees at a point $P_1$, a point $P_2$, and a point $P_3$ using the evaluation data set at each of the point $P_1$, the point $P_2$, and the point $P_3$ and the reference data set at each point.

In FIG. 2, a graph $5P_1$ shows the probability distribution of the driving information at the point $P_1$, a graph $5P_2$ shows the probability distribution of the driving information at the point $P_2$, and a graph $5P_3$ shows the probability distribution of the driving information at the point $P_3$. In the graphs $5P_1$ to $5P_3$, the horizontal axis represents the driving information, while the vertical axis represents the frequency of the corresponding driving information. A curve 2 is the probability distribution of the driving information included in the reference data set, while a curve 3 is the probability distribution of the driving information included in the evaluation data set. The driving information, which includes a plurality of physical quantities, is basically represented as multidimensional quantities. However, in the graphs $5P_1$ to $5P_3$, the multiple physical quantities are converted into one-dimensional feature quantities for the convenience of description, and the obtained feature quantities, or the driving information, are plotted on the horizontal axis.

The abnormality degree calculator 21 calculates as an abnormality degree, the dissimilarity between the probability distribution of the driving information in the reference data set, represented by the curve 2, and the probability distribution of the driving information in the evaluation data set, represented by the curve 3. Note that the driving information may be represented as two- or higher-dimensional feature quantities. In this case, the probability distributions of the driving information represented by the curves 2 and 3 are multidimensional probability distributions. In the example shown in FIG. 2, the dissimilarity between the probability distributions of the curve 2 and the curve 3 is greater in the graph $5P_2$ than in the graph $5P_1$, and the dissimilarity between the probability distributions of the curve 2 and the curve 3 is greater in the graph $5P_3$ than in the graph $5P_2$. Consequently, the point $P_1$ had an abnormality degree of 0.3, the point $P_2$ has an abnormality degree of 0.72, and the point $P_3$ has an abnormality degree of 0.8.

The abnormality degree DB 22 is a data storage area for management of the abnormality degrees calculated by the abnormality degree calculator 21, and for example, manages each abnormality degree in association with an abnormality degree ID that is an identifier used to uniquely identify the abnormality degree. The abnormality degrees accumulated in the abnormality degree DB 22 correspond to a plurality of preaccumulated abnormality degrees in the claims.

The attribute information DB 23 is a data storage area for management of the attribute information associated with the driving information used in the calculation of the abnormality degrees. In order to distinguish which attribute information is associated with the driving information used in the calculation of a particular abnormality degree, the attribute information DB 23 manages attribute information in association with the same abnormality degree ID as set at the abnormality degree calculated from the corresponding driving information. In other words, when attribute information is selected from the attribute information DB 23, the abnormality degree associated with the selected attribute information is obtained from the abnormality degree DB 22 via the abnormality degree ID. When an abnormality degree calculated by the abnormality degree calculator 21 is used to detect whether an abnormality is found in vehicle behavior, the threshold estimator 24 estimates an abnormality threshold that is the abnormality degree at which the presence or absence of an abnormality is erroneously determined with a predefined probability.

The threshold estimator 24 thus includes an estimation unit determiner 25 and an estimator 27, which are functional blocks, and an estimation DB 26, which is a data storage area.

The estimation unit determiner 25 determines an estimation unit for which an abnormality threshold is estimated. The estimation unit for an abnormality threshold is a unit for the calculation of the abnormality threshold determined based on attribute information. The threshold estimator 24 estimates an abnormality threshold for each unit. More specifically, the abnormality threshold estimated by the threshold estimator 24 is used to detect whether an abnormality is found in the vehicle behavior within a particular range of attribute information, and this range is the estimation unit for the abnormality threshold.

The estimation unit determiner 25 may determine an estimation unit for an abnormality threshold in any manner within a range identified by the attribute information managed in the attribute information DB 23. For example, the estimation unit determiner 25 determines, as an estimation unit for an abnormality threshold, the estimation unit specified by the user based on the attribute information managed in the attribute information DB 23.

The estimation unit determiner 25 extracts the abnormality degrees within the determined estimation unit from the abnormality degree DB 22 and stores them into the estimation DB 26.

The estimation DB 26 stores the abnormality degree received from the estimation unit determiner 25 for each estimation unit.

As an example, when all points at which driving information has been collected are set at an estimation unit for an abnormality threshold, the estimation unit determiner 25 obtains all the abnormality degrees stored in the abnormality degree DB 22 and stores them into the estimation DB 26.

As another example, the neighboring area of the point specified by the user is set at an estimation unit for an abnormality threshold, the estimation unit determiner 25 refers to the attribute information DB 23 to identify the abnormality degree IDs of the attribute information corresponding to the positional information on the points within a defined range from the specified point. The estimation unit determiner 25 then extracts the abnormality degrees associated with the identified abnormality degree IDs from the abnormality degree DB 22 and stores them into the estimation DB 26. Note that the neighboring area of the specified point may not necessarily be represented by a circle around the specified point, but the neighboring area may have any shape such as a rectangle, a triangle, a pentagon, or a polygon with more angles. The neighboring area of the specified point may also be defined based on the distance along the road links to the specified point. In this case, the neighboring area is the road area within the distance defined from the specified point and along the shape of the road passing through the point.

As yet another example, if an estimation unit for an abnormality threshold is set at a range of vehicles traveling during the time period of one hour from 16:00, the estimation unit determiner 25 refers to the attribute information DB 23 to identify the abnormality degree IDs of the attribute information corresponding to the traveling time information on one hour from 16:00. The estimation unit determiner 25 then extracts the abnormality degrees associated with the identified abnormality degree IDs from the abnormality degree DB 22 and stores them into the estimation DB 26. Note that the user may specify an estimation unit for an abnormality threshold using a combination of a plurality of attributes, such as vehicles traveling during the time period of one hour from 16:00 in a rainy day. In this case, the estimation unit determiner 25 refers to the attribute information DB 23 to identify the abnormality degree IDs of the attribute information corresponding to the weather information on rain and the traveling time information on one hour from 16:00. Then, the estimation unit determiner 25 may extract the abnormality degrees associated with the identified abnormality degree IDs from the abnormality degree DB 22 and store them into the estimation DB 26.

As still another example, if an estimation unit for an abnormality threshold is set at a unit of attribute information similar to specified attribute information, the estimation unit determiner 25 refers to the attribute information DB 23 to identify the abnormality degree IDs of the attribute information corresponding to the attribute information similar to the specified attribute information. The estimation unit determiner 25 then extracts the abnormality degrees associated with the identified abnormality degree IDs from the abnormality degree DB 22 and stores them into the estimation DB 26.

In a state with attribute information being similar, for example, when the similarity of each attribute included in the attribute information is transformed into a number, the similarity is equal to or greater than a predefined reference degree of similarity (e.g., 90%). The similarity of the attribute information may be evaluated using, for example, a known similarity evaluation technique such as the cosine distance or the Mahalanobis distance between the vectors of the attributes included in the attribute information. The reference similarity may be changed by a user.

Hereinafter, the abnormality degrees calculated using the driving information associated with the attribute information satisfying the conditions of the specified estimation unit for an abnormality threshold will be referred to as the abnormality degrees within the estimation unit.

The estimator 27 uses a set of abnormality degrees accumulated in the estimation DB 26, or more specifically, an abnormality degree distribution 4 generated from the set of abnormality degrees within the estimation unit, to estimate an abnormality threshold that is the abnormality degree at which the presence or absence of an abnormality is erroneously determined with a predefined probability.

The abnormality degree distribution 4 is the distribution of the abnormality degrees within the estimation unit and for example, shown in a graph with the horizontal axis representing the abnormality degree and the vertical axis representing the frequency of the abnormality degree.

The probability of erroneous determination as to the presence or absence of an abnormality is the probability with which an abnormality is erroneously determined to be found although the vehicle behavior has no abnormality in reality, or the probability with which an abnormality is erroneously determined to be not found although the vehicle behavior has an abnormality in reality. In the present embodiment, an example will be described of setting a probability with which an abnormality is erroneously determined to be found although the vehicle behavior has no abnormality in reality, or a false-positive rate.

If a false-positive rate is set at a % (a is a positive real number), the estimator 27 estimates the abnormality threshold that leads to a false-positive rate of a % for the vehicle behavior undergoing abnormality detection. The mode of estimating the abnormality threshold by the estimator 27 will be described in detail later.

After estimating the abnormality threshold for each estimation unit, the estimator 27 stores the estimated abnormality threshold into the abnormality threshold DB 28.

In this manner, the threshold estimator 24 determines an estimation unit for an abnormality threshold and estimates the abnormality threshold from the abnormality degrees within the estimation unit for the abnormality threshold among the plurality of abnormality degrees preaccumulated in the abnormality degree DB 22.

The abnormality detector 29 compares the abnormality degree of the evaluation data set representing the vehicle behavior undergoing abnormality detection and the abnormality threshold estimated by the threshold estimator 24 to detect whether an abnormality is found in the vehicle behavior, and outputs the detection result. More specifically, if the abnormality degree of the evaluation data set is equal to or greater than the abnormality threshold, the abnormality detector 29 detects that an abnormality is found in the vehicle behavior. If the abnormality degree of the evaluation data set is lower than the abnormality threshold, the abnormality detector 29 detects that no abnormality is found in the vehicle behavior.

The user considers what criteria to apply for detecting the presence or absence of an abnormality from the evaluation data set, and specifies the abnormality threshold for the estimation unit corresponding to the criteria desired to be applied for the abnormality detection. The abnormality detector 29 obtains the user-specified abnormality threshold for the estimation unit from the abnormality threshold DB 28 and uses the obtained abnormality threshold for the abnormality detection.

For example, it is assumed that the evaluation data set is the driving information set at the point $P_1$ shown in FIG. 2. In this case, when the user specifies the vehicle traveling point as a basis to detect the presence or absence of an abnormality, the abnormality detector 29 performs the abnormality detection using the abnormality threshold estimated from the abnormality degree distribution 4 of the abnormality degrees calculated based on the driving information associated with the attribute information corresponding to the positional information set at the point $P_1$. In another case, the user may specify the number of road traffic lanes at the point $P_1$ as a basis to detect the presence or absence of an abnormality. In this case, the abnormality detector 29 performs the abnormality detection using the abnormality threshold estimated from the abnormality degree distribution 4 of the abnormality degrees calculated based on the driving information associated with the attribute information corresponding to the same number of traffic lanes as the number of road traffic lanes at the point $P_1$. In another case, when the user specifies the traveling weather (e.g., rain) at the point $P_1$ as a basis to detect the presence or absence of an abnormality, the abnormality detector 29 performs the abnormality detection using the abnormality threshold estimated from the abnormality degree distribution 4 of the abnormality degrees calculated based on the driving information associated with the attribute information corresponding to the specified weather (i.e., rain).

In this manner, the abnormality detector 29 detects the presence or absence of an abnormality in the vehicle behavior using the abnormality threshold for the estimation unit corresponding to the criteria specified by the user for evaluating the presence or absence of an abnormality from the evaluation data set.

An example main part configuration of an electrical system in the abnormality detection apparatus 20 will now be described.

Figure 3:
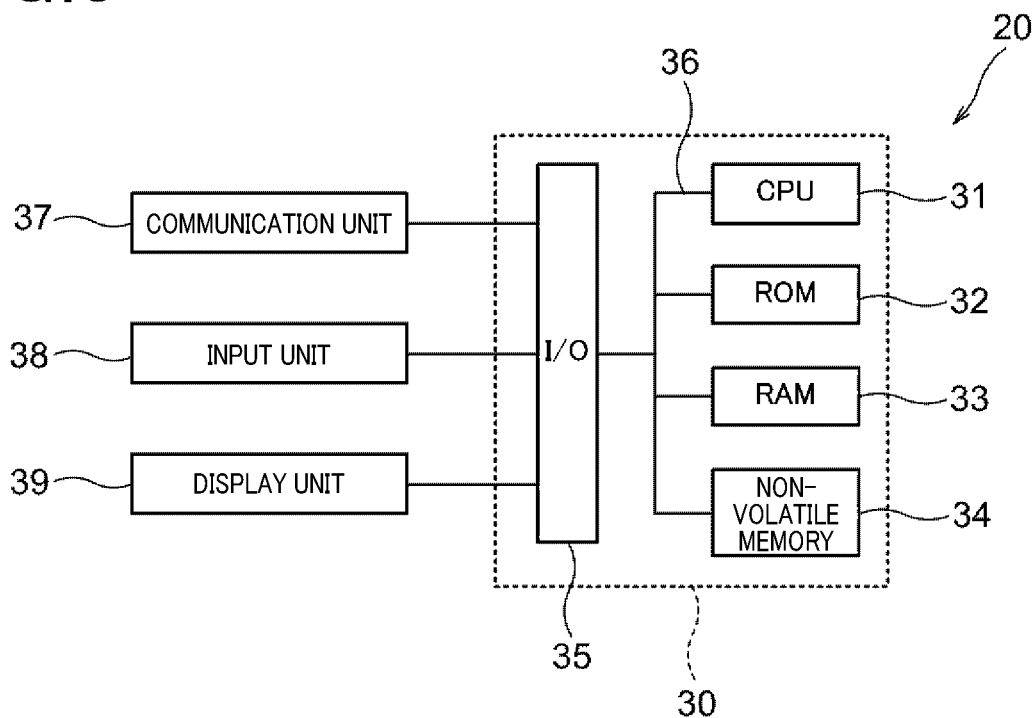
FIG. 3 illustrates an example main part configuration of an electrical system in an abnormality detection apparatus.

As shown in FIG. 3, the abnormality detection apparatus 20 is, for example, implemented using a computer 30.

The computer 30 includes a central processing unit (CPU) 31 responsible for each function block of the abnormality detection apparatus 20, and a read only memory (ROM) 32 storing abnormality detection programs for causing the computer 30 to operate as the functional blocks of the abnormality detection apparatus 20 illustrated in FIG. 1. The computer 30 also includes a random access memory (RAM) 33 used as a temporary work area for the CPU 31, a non-volatile memory 34, and an input-output interface (I/O) 35. The CPU 31, the ROM 32, the RAM 33, the non-volatile memory 34, and the I/O 35 are connected to each other via a bus 36.

The non-volatile memory 34 is an example storage device that maintains its stored information even after the stop of the power fed to the non-volatile memory 34. The non-volatile memory 34 is, for example, semiconductor memory, but may also be a hard disk drive. The non-volatile memory 34 may not necessarily be incorporated in the computer 30, but may be a portable storage device attachable to and detachable from the computer 30, such as a memory card.

The I/O 35 is, for example, connected to a communication unit 37, an input unit 38, and a display unit 39.

The communication unit 37 is connected to a communication line (not shown) and has a communication protocol for data communication with devices connected to the communication line (not shown), such as the output device 10. Note that the communication line (not shown) connected to the communication unit 37 may be wireless or wired, and a private line or a public line connected to a large number of unspecified devices, such as the Internet.

The input unit 38 is a device that receives an instruction from the user and informs the CPU 31 of the instruction, such as a button, a touch panel, a keyboard, or a mouse. If the user enters an instruction by voice, the input unit 38 may be a microphone.

The display unit 39 is a device that displays information processed by the CPU 31, such as a liquid crystal display, an organic electroluminescence (EL) display, or a projector that projects a picture on a screen.

It should be noted that the abnormality detection apparatus 20 may not necessarily be implemented using a single computer 30. For example, a different computer 30 may be assigned to each functional block illustrated in FIG. 1. In this case, the abnormality detection apparatus 20 is implemented using a plurality of computers 30. The computer 30 may also be replaced with, for example, a cloud computing service that provides the same type of processing power as the computer 30 through the Internet.

The operation of the abnormality detection apparatus 20 will now be described for detecting whether an abnormality is found in the vehicle behavior represented by the evaluation data set undergoing the abnormality detection. Hereinafter, the evaluation data set undergoing abnormality detection will be specifically referred to as the detection target data set. The detection target data set corresponds to first driving information in the claims.

Figure 4:
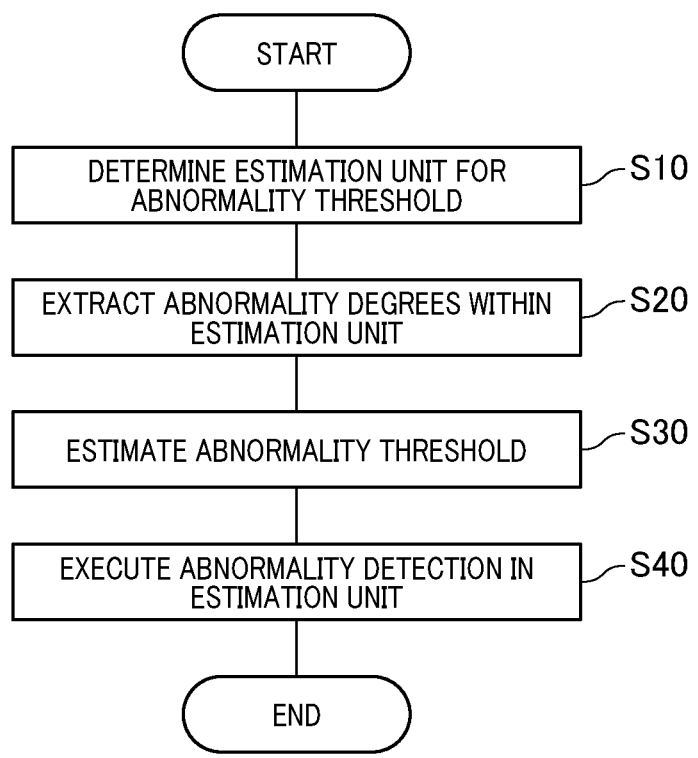
FIG. 4 is a flowchart showing an example of abnormality detection processing according to a first embodiment.

FIG. 4 is a flowchart showing an example of the abnormality detection processing performed by the CPU 31 of the abnormality detection apparatus 20 in response to an instruction for abnormality determination as to the specified vehicle behavior. The abnormality detection programs that define the abnormality detection processing are, for example, prestored in the ROM 32 of the abnormality detection apparatus 20. The CPU 31 of the abnormality detection apparatus 20 reads the abnormality detection programs stored in the ROM 32 to execute the abnormality detection processing.

The abnormality degree DB 22 prestores the abnormality degree of each evaluation data set received so far by the abnormality detection apparatus 20. The attribute information DB 23 prestores the attribute information associated with the driving information items included in the evaluation data that has been subjected to the calculation of the abnormality degrees. It is also assumed that the false-positive rate used in the estimation of an abnormality threshold is specified in advance.

In an example, the abnormality degree DB 22, the attribute information DB 23, the estimation DB 26, and the abnormality threshold DB 28 may be constructed in the non-volatile memory 34, and the false-positive rate specified by the user may also be stored in the non-volatile memory 34. However, the abnormality degree DB 22, the attribute information DB 23, the estimation DB 26, and the abnormality threshold DB 28 may not necessarily be constructed in the non-volatile memory 34, and the false-positive rate may also not be stored in the non-volatile memory 34. For example, the abnormality degree DB 22, the attribute information DB 23, the estimation DB 26, and the abnormality threshold DB 28 may be constructed, and the false-positive rate may be stored in a storage device connected to the communication line (not shown) via the communication unit 37.

First, in step S10, the CPU 31 determines the estimation unit indicated by the user as the estimation unit for which an abnormality threshold is estimated.

In step S20, the CPU 31 extracts the abnormality degrees within the estimation unit determined in step S10 from the abnormality degree DB 22, and stores the extracted abnormality degrees into the estimation DB 26.

In step S30, the CPU 31 generates the abnormality degree distribution 4 using the abnormality degrees within the estimation unit stored into the estimation DB 26 in step S20.

Figure 5:
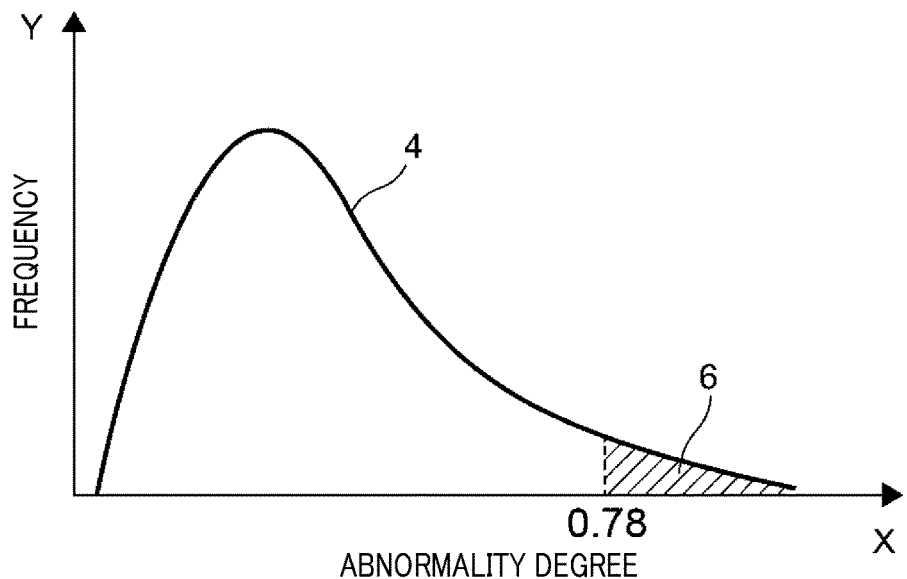
FIG. 5 illustrates an example abnormality degree distribution.

For the convenience of description, the abnormality degree distribution 4 shown in FIG. 5 is represented as a smooth curve by interpolating the points of the frequencies at the abnormality degrees. However, the actual abnormality degree distribution 4 is a discrete distribution. The abnormality degree distribution 4 is created by plotting the frequencies of the abnormality degrees within the estimation unit, and thus is an empirical distribution estimated from the frequencies of occurrence of abnormality degrees having an unknown distribution.

The CPU 31 then uses the generated abnormality degree distribution 4 to estimate the abnormality threshold at which the false-positive rate for the vehicle behavior undergoing abnormality detection is the false-positive rate specified by the user. The CPU 31 stores the estimated abnormality threshold into the non-volatile memory 34 in association with the estimation unit determined in step S10.

The area of the abnormality degree distribution 4, which is defined by the generated abnormality degree distribution 4 and the X axis, represents the probability of the occurrence of abnormality degrees. Thus, the CPU 31 estimates an abnormality threshold that is the abnormality degree corresponding to the area extending from the greatest abnormality degree and having the proportion represented by the false-positive rate to the total area of the abnormality degree distribution 4 defined by the X axis and the generated abnormality degree distribution 4.

Owing to a low probability of the occurrence of an abnormality in a travel environment, such as road subsidence, the abnormality degrees stored in the abnormality degree DB 22 may be assumed to be abnormality degrees obtained when no abnormality is found in the vehicle behavior. Thus, when the specified false-positive rate is a %, and a portion 6 is defined to have an area with its proportion being a % to the total area of the abnormality degree distribution 4, the abnormality degree at the point of the intersection of the X axis with the boundary of the portion 6 along the Y axis corresponds to the area with its proportion represented by a false-positive rate of a %. In the example of FIG. 5, an abnormality degree of 0.78 is estimated as an abnormality threshold.

In step S40, the CPU 31 compares the abnormality degree calculated from the detection target data set (referred to as the detection target abnormality degree) and the abnormality threshold estimated in step S30. If the detection target abnormality degree is equal to or greater than the abnormality threshold, the CPU 31 outputs the abnormality detection result that the vehicle behavior represented by the detection target data set has an abnormality. If the detection target abnormality degree is lower than the abnormality threshold, the CPU 31 outputs the abnormality detection result that the vehicle behavior represented by the detection target data set has no abnormality.

After that, the abnormality detection processing shown in FIG. 4 is finished.

Note that the details of the estimation unit for the abnormality threshold determined in step S10 may affect the accuracy of the abnormality detection in the vehicle behavior.

For example, when all points at which driving information has been collected are set at an estimation unit for an abnormality threshold, the estimation unit for the abnormality threshold includes all the abnormality degrees stored in the abnormality degree DB 22. Thus, even in the case of the re-estimation of the abnormality threshold after new abnormality degrees not used in the estimation of the abnormality threshold are stored into the abnormality degree DB 22, the proportion of the number of abnormality degrees newly added to the estimation unit to the number of abnormality degrees within the estimation unit is less than in the case in which an estimation unit for an abnormality threshold is limited to a particular point. As a result, the re-estimated abnormality threshold will vary little. However, different points have different vehicle travel environments, and thus the abnormality degree calculated at each point may have a different range (also referred to as an abnormality threshold degree). Accordingly, if all points at which driving information has been collected are set at an estimation unit for an abnormality threshold, the accuracy of the abnormality detection in the vehicle behavior tends to vary depending on the point at which the detection target data set is collected. Hereinafter, detecting the presence or absence of an abnormality in vehicle behavior will be referred to as abnormality detection, and the detection accuracy of the abnormality detection will be referred to as abnormality detection accuracy.

If, for example, the neighboring area of the point at which the detection target data set has been collected is set at an estimation unit for an abnormality threshold, the abnormality degrees within the estimation unit for the abnormality threshold is limited to a subset of abnormality degrees smaller in number than all the abnormality degrees stored in the abnormality degree DB 22.

In this situation, it is assumed that the abnormality threshold is re-estimated after new abnormality degrees not used in the estimation of the abnormality threshold are stored into the abnormality degree DB 22. In this case, to the number of abnormality degrees within the estimation unit, the proportion of the number of abnormality degrees newly added to the estimation unit is greater than in the case in which all points are set at an estimation unit for an abnormality threshold. As a result, the re-estimated abnormality threshold tends to vary widely. However, the point at which the detection target data set has been collected is similar in many respects to the neighboring area of the point in travel environment because they are adjacent areas, and accordingly the neighboring area tends to have similar vehicle behavior. Thus, if the neighboring area of the point at which the detection target data set has been collected is set at an estimation unit for an abnormality threshold, the abnormality detection accuracy varies less than in the case in which all points at which driving information has been collected are set at the estimation unit for the abnormality threshold, and the abnormality detection accuracy tends to approach the false-positive rate.

Also in the case where attribute information similar to the attribute information at the point at which the detection target data set has been collected is set at an estimation unit for an abnormality threshold, the vehicle behavior represented by the driving information associated with the attribute information tends to be similar because of the similarity of the attribute information. Thus, the abnormality detection accuracy tends to approach the specified false-positive rate compared with the case in which all points at which the driving information has been collected are set at the estimation unit for the abnormality threshold.

The user preferably specifies an estimation unit based on the above-described trends in the variation of the abnormality detection accuracy that depends on the specification of the estimation unit.

In an example, it is assumed that the user requests that abnormality detection accuracy be closest possible to the specified false-positive rate, and then specifies the estimation unit for the abnormality threshold as all points at which the driving information has been collected. In this case, the CPU 31 may control the display unit 39 to notify the user that the estimation unit for the abnormality threshold is inappropriate, and additionally present an appropriate way of specifying the estimation unit to achieve the predetermined abnormality detection accuracy.

In this manner, the abnormality detection apparatus 20 according to the present embodiment extracts the abnormality degrees within the estimation unit from the abnormality degree DB 22 in which abnormality degrees at each point are accumulated. The abnormality detection apparatus 20 then uses the abnormality degree distribution 4 of the extracted abnormality degrees to estimate the abnormality threshold at which the abnormality detection accuracy is the predetermined false-positive rate. The abnormality detection apparatus 20 can thus perform abnormality detection with the predetermined abnormality detection accuracy even if the theoretical relationship is unclear between the abnormality detection accuracy and the abnormality threshold.

In addition, the estimation unit for the abnormality threshold can be narrowed down in a manner to increase the number of attributes similar to the attribute information at the point undergoing abnormality detection. This enables the abnormality degree distribution 4 to be more similar to the actual abnormality degree distribution of the behavior of vehicles traveling through the point undergoing the abnormality detection. Accordingly, the abnormality detection accuracy approaches the predetermined abnormality detection accuracy.

Second Embodiment

The abnormality detection method for vehicle behavior is not limited to the abnormality detection method described in the first embodiment.

Thus, in a second embodiment, an example will be described in which estimation modes of estimating the abnormality threshold from an abnormality degree distribution 4 are switched in dependence upon the number of data items of the abnormality degrees used to generate the abnormality degree distribution 4. The configuration of an abnormality detection apparatus 20 according to the second embodiment is the same as the configuration of the abnormality detection apparatus 20 described in the first embodiment. The configuration of the abnormality detection apparatus 20 will thus not be described repeatedly, and differences will be described mainly. In the second embodiment, the same reference numerals as in the first embodiment refer to the same components and steps, for which see the preceding description.

Figure 6:
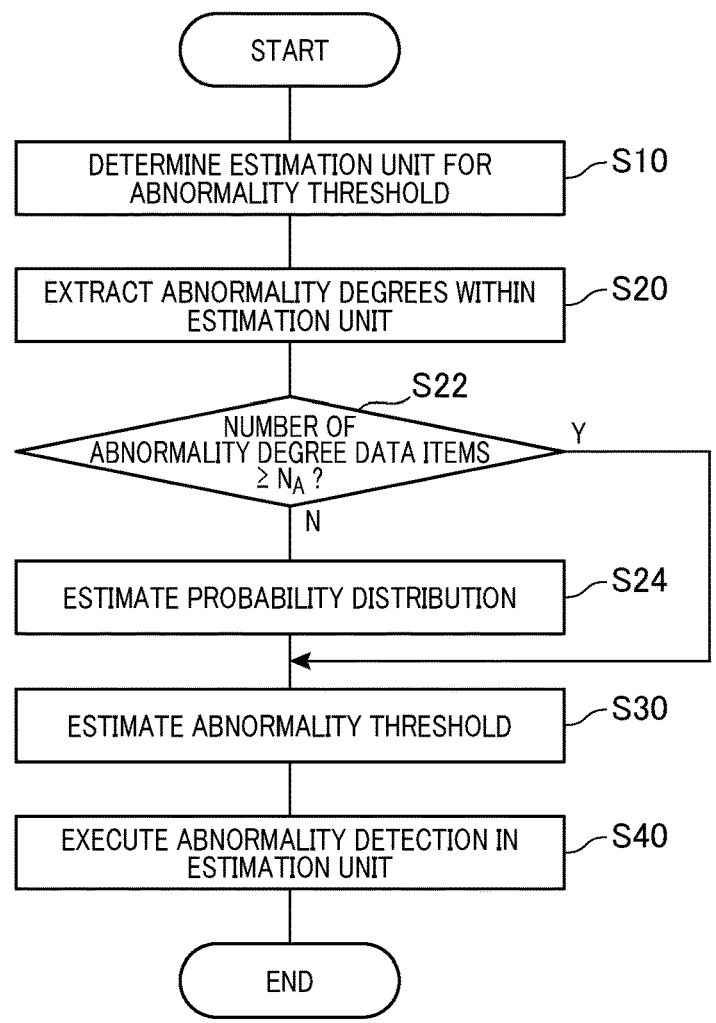
FIG. 6 is a flowchart showing an example of abnormality detection processing according to a second embodiment.

FIG. 6 is a flowchart showing an example of abnormality detection processing according to the second embodiment performed by the CPU 31 of the abnormality detection apparatus 20 in response to an instruction for abnormality determination as to the specified vehicle behavior. The abnormality detection programs that define the abnormality detection processing are, for example, prestored in the ROM 32 of the abnormality detection apparatus 20. The CPU 31 of the abnormality detection apparatus 20 reads the abnormality detection programs stored in the ROM 32 to execute the abnormality detection processing.

The flowchart shown in FIG. 6 is different from the flowchart in FIG. 4 of the abnormality detection processing according to the first embodiment, in including steps S22 and S24. The other steps are the same as those shown in FIG. 4.

In step S20, the abnormality degrees within the estimation unit determined in step S10 are extracted from the abnormality degree DB 22, and then step S22 is executed.

In step S22, the CPU 31 determines whether the number of data items of the abnormality degrees within the estimation unit is equal to or greater than the number of reference data items NA.

The number of reference data items NA is the minimum number of data items of the abnormality degrees within the estimation unit that are needed to generate the abnormality degree distribution 4 used to obtain an abnormality threshold at which the abnormality detection accuracy is the specified false-positive rate. This number is represented by a positive integer. Since the abnormality degree distribution 4 is generated from the abnormality degrees within the estimation unit, the abnormality degrees within the estimation unit are sometimes referred to as the abnormality degree population.

If the number of data items of the abnormality degrees within the estimation unit is equal to or greater than the number of reference data items NA, the abnormality threshold estimated using the abnormality degree distribution 4 generated from the abnormality degrees within the estimation unit is an abnormality threshold at which the abnormality detection accuracy is the specified false-positive rate. Thus, the CPU 31 proceeds to step S30 to estimate the abnormality threshold in the same estimation mode as in the abnormality detection processing described in the first embodiment.

In contrast, if the number of data items of the abnormality degrees within the estimation unit is less than the number of reference data items NA, the gap between the false-positive rate and the abnormality detection accuracy becomes wider than in the case of abnormality detection using the abnormality threshold estimated from the abnormality degree distribution 4 obtained when the number of data items of the abnormality degrees is equal to or greater than the number of reference data items NA. Thus, the CPU 31 proceeds to step S24 to estimate the abnormality threshold using a parametric method. The parametric method is a method of statistical analysis for estimating an abnormality threshold on the assumption that the abnormality degrees within the estimation unit have a specific distribution.

In step S24, the CPU 31 applies to the abnormality degree distribution 4 generated from the abnormality degrees within the estimation unit a known probability distribution having a most similar distribution trend, and proceeds to step S30. That is, the CPU 31 estimates the abnormality threshold on the assumption that the abnormality degrees within the estimation unit have the specific probability distribution that is applied to the abnormality degree distribution 4 in step S24.

The probability distribution may be in any type, and the CPU 31 may apply to the abnormality degree distribution 4 a probability distribution such as a normal distribution, a gamma distribution, or a chi-square distribution, or a combined distribution of a plurality of known probability distributions.

When a known probability distribution is applied to the abnormality degree distribution 4, the CPU 31 in step S30 estimates an abnormality threshold that is the abnormality degree corresponding to the area extending from the greatest abnormality degree and having the proportion represented by the false-positive rate to the total area of the probability distribution defined by the X axis and the probability distribution.

The state in which the number of abnormality degree data items is equal to or greater than the number of reference data items NA is referred to as "the number of data items of the abnormality degrees is statistically satisfied." The state in which the number of abnormality degree data items is less than the number of reference data items NA is referred to as "the number of data items of the abnormality degrees is not statistically satisfied."

The abnormality threshold is estimated from the known probability distribution that is applied to the abnormality degree distribution 4 as its approximate distribution. Even if the number of data items of the abnormality degrees within the estimation unit is not statistically satisfied, this estimation gives the abnormality threshold at which the abnormality detection accuracy is the specified false-positive rate. That is, estimation modes of estimating the abnormality threshold are switched in dependence upon the number of data items of the abnormality degrees within the estimation unit, and the switching enables the estimation of the abnormality threshold at which the abnormality detection accuracy is the specified false-positive rate, irrespective of the number of data items of the abnormality degrees.

A specific set value of the number of reference data items NA used in the determination processing in step S22 of FIG. 6 will now be described.

It is first assumed that the abnormality degrees follow a normal distribution with an unknown mean and variance 1. It is also assumed that the specified false-positive rate is 5%, and the false-positive rate has an error within ±1% with a probability of 99%. The condition that the false-positive rate has an error within ±1% with a probability of 99% means that if the specified false-positive rate is 5%, abnormality detection with the estimated abnormality threshold has an actual false-positive rate of 4% or more and 6% or less with a probability of 99%.

For the abnormality degree following the normal distribution with unknown mean and variance 1, the relationship between the false-positive rate and the abnormality threshold can be expressed as described below with the unknown mean denoted by G. If the false-positive rate is 6%, the abnormality threshold is (G+1.555). If the false-positive rate is 5%, the abnormality threshold is (G+1.645). If the false-positive rate is 4%, the abnormality threshold is (G+1.751). In this case, the abnormality thresholds at the false-positive rates of 4% and 5% have a difference of 0.106, and the abnormality thresholds at the false-positive rates of 5% and 6% have a difference of 0.090. Thus, when the mean of the abnormality degrees of the abnormality degree population deviates from the true value by 0.090, the false-positive rate deviates by 1%. In other words, if the error is equal to or less than 0.090 between the estimated mean and the true mean of the abnormality degrees of the abnormality degree population, the false-positive rate has an error equal to or less than 1%.

The mean of the abnormality degrees estimated from an abnormality degree population including N (N is a positive integer) abnormality degrees has a normal distribution with mean of the true mean of the abnormality degree population and variance 1/N. Since the variance indicates the degree of variation in the abnormality degrees from the mean, the variance decreases with increasing probability of a reduction in the error from the true mean of the abnormality degrees. As a result of the calculation of the incidence of error with a specific numerical value substituted for N, it is found that, for N=820, the error from the true mean of the abnormality degrees is equal to or less than 0.090 with a probability of 99%.

The result has revealed that the number of reference data items NA may be set at 820 so that the abnormality detection accuracy falls within false-positive rates of 5%±1% with a probability of 99%. In this manner, the user may assume the variance of the abnormality degree population having an unknown distribution and then set the number of reference data items NA based on the error between the target false-positive rate and an allowable false-positive rate.

In each embodiment, an example has been described in which abnormality detection is performed using an abnormality threshold estimated when the abnormality detection accuracy is represented by a false-positive rate. However, the abnormality detection accuracy may be defined by a probability with which an abnormality is erroneously determined to be not found although the vehicle behavior has an abnormality in reality, or a false-negative rate.

In this case, the abnormality detection apparatus 20 preliminarily obtains a reference data set that is a set of driving information at each point collected in a situation in which an abnormality is found in the travel environment, and stores the abnormality degree of each reference data set into the abnormality degree DB 22. The abnormality detection apparatus 20 estimates an abnormality threshold that is the abnormality degree corresponding to the area extending from the smallest abnormality degree and having the proportion represented by the false-negative rate to the total area of the abnormality degree distribution 4 defined by the X axis and the abnormality degree distribution 4 as shown in FIG. 5 generated from the abnormality degrees within the estimation unit.

On real roads, a situation in which an abnormality is found in the travel environment is less likely to occur than a situation in which no abnormality is found in the travel environment. Accordingly, it is more challenging to obtain a reference data set when the abnormality detection accuracy is defined by a false-negative rate than when the abnormality detection accuracy is defined by a false-positive rate. It is thus more preferable to define the abnormality detection accuracy by a false-positive rate. The false-positive rate and the false-negative rate correspond to a predefined probability in the claims.

Although the present disclosure has been described with reference to embodiments, the disclosure is not limited to the embodiments. The embodiments may be modified or improved variously without departing from the scope and spirit of the present disclosure, and such modified or improved embodiments also fall within the technical scope of the present disclosure. For example, the procedures of the abnormality detection processing shown in FIGS. 4 and 6 may be changed without departing from the scope and spirit of the present disclosure.

In the above embodiments, the abnormality detection processing is described as being implemented by software as an example. However, the processing corresponding to at least one step of the flowcharts shown in FIGS. 4 and 6 may be implemented, for example, in an application specific integrated circuit (ASIC) and executed by hardware. In this case, the abnormality detection processing will be faster than implemented by software.

In the above embodiments, the abnormality detection programs are described as being installed in the ROM 32, but this is not exclusive. The abnormality detection programs according to the present disclosure may be provided in the form recorded on a computer-readable storage medium. For example, the abnormality detection programs according to the present disclosure may be provided in the form recorded on an optical disc such as a compact disc (CD)-ROM or a digital versatile disc (DVD)-ROM. The abnormality detection programs according to the present disclosure may also be provided in the form recorded on a semiconductor memory device such as a universal serial bus (USB) memory device or a memory card. In other cases, the abnormality detection apparatus 20 may download the abnormality detection programs according to the present disclosure via a communication line (not shown) from an external device connected to the communication line (not shown).

What is claimed is:

1. An abnormality detection method for detecting an abnormality in vehicle behaviors based on an abnormality degree indicating a degree of difference between first driving information representing vehicle behaviors undergoing abnormality detection and second driving information obtained when no abnormality is found in a travel environment, the first driving information being driving information transmitted and received from vehicles that are traveling, the method using a processor executing one or more programs stored in a non-transitory memory, and comprising:
    estimating an abnormality threshold using an abnormality degree distribution generated from a set of preaccumulated abnormality degrees, the abnormality threshold being an abnormality degree allowing a probability of erroneous determination as to presence or absence of an abnormality to be a predefined probability; and
    detecting whether an abnormality is found in the vehicle behaviors by comparing the abnormality degree for the first driving information and the estimated abnormality threshold.

2. The abnormality detection method according to claim 1, further comprising
    switching estimation modes of estimating the abnormality threshold from the abnormality degree distribution based on a number of abnormality degrees used for generation of the abnormality degree distribution.

3. The abnormality detection method according to claim 2, further comprising:
   in response to a number of data items of the abnormality degrees used for generation of the abnormality degree distribution being equal to or greater than a predefined number of reference data items, estimating the abnormality threshold being an abnormality degree corresponding to an area extending from a greatest abnormality degree and having a proportion represented by the probability of erroneous determination to a total area of the abnormality degree distribution; and
   in response to the number of data items of the abnormality degrees used for generation of the abnormality degree distribution being less than the number of reference data items, applying to the abnormality degree distribution a specific probability distribution and estimating the abnormality threshold being an abnormality degree corresponding to an area extending from a greatest abnormality degree and having a proportion represented by the probability of erroneous determination to a total area of the probability distribution.

4. The abnormality detection method according to claim 1, further comprising:
   determining an estimation unit for the abnormality threshold; and
   estimating the abnormality threshold from abnormality degrees within the estimation unit for the abnormality threshold among the plurality of preaccumulated abnormality degrees.

5. The abnormality detection method according to claim 4, further comprising:
   determining, as the estimation unit for the abnormality threshold, a unit of a neighboring area within a predefined range from a vehicle traveling point; and
   estimating the abnormality threshold used for the neighboring area from the vehicle traveling point.

6. The abnormality detection method according to claim 4, further comprising:
   determining, as the estimation unit for the abnormality threshold, a unit of attribute information similar to attribute information about a vehicle travel environment; and
   estimating the abnormality threshold used for a range including the attribute information determined as the estimation unit for the abnormality threshold.

7. An abnormality detection apparatus for detecting whether an abnormality is found in vehicle behaviors based on an abnormality degree indicating a degree of difference between first driving information representing vehicle behaviors and second driving information obtained when no abnormality is found in a travel environment, the first driving information being driving information transmitted and received from vehicles that are traveling, the abnormality detection apparatus comprising:
   a non-transitory memory storing one or more computer programs; and
   a processor executing the one or more computer programs to:
   estimate an abnormality threshold using an abnormality degree distribution generated from a set of preaccumulated abnormality degrees, the abnormality threshold being an abnormality degree allowing a probability of erroneous determination as to presence or absence of an abnormality to be a predefined probability; and
   detect whether an abnormality is found in the vehicle behaviors by comparing the abnormality threshold estimated and the abnormality degree for the first driving information.

8. The abnormality detection apparatus according to claim 7, wherein
   the processor further executes the one or more computer programs to switch estimation modes of estimating the abnormality threshold from the abnormality degree distribution based on a number of abnormality degrees used for generation of the abnormality degree distribution.

9. The abnormality detection apparatus according to claim 8, wherein
   the processor further executes the one or more computer programs to:
   in response to a number of data items of the abnormality degrees used for generation of the abnormality degree distribution being equal to or greater than a predefined number of reference data items, estimate the abnormality threshold being an abnormality degree corresponding to an area extending from a greatest abnormality degree and having a proportion represented by the probability of erroneous determination to a total area of the abnormality degree distribution; and
   in response to the number of data items of the abnormality degrees used for generation of the abnormality degree distribution being less than the number of reference data items, apply to the abnormality degree distribution a specific probability distribution and estimate the abnormality threshold being an abnormality degree corresponding to an area extending from a greatest abnormality degree and having a proportion represented by the probability of erroneous determination to a total area of the probability distribution.

10. The abnormality detection apparatus according to claim 7, wherein
    the processor further executes the one or more computer programs to determine an estimation unit for the abnormality threshold, and estimate the abnormality threshold from abnormality degrees within the estimation unit for the abnormality threshold among the plurality of preaccumulated abnormality degrees.

11. The abnormality detection apparatus according to claim 10, wherein
    the processor further executes the one or more computer programs to determine, as the estimation unit for the abnormality threshold, a unit of a neighboring area within a predefined range from a vehicle traveling point, and estimate the abnormality threshold used for the neighboring area from the vehicle traveling point.

12. The abnormality detection apparatus according to claim 10, wherein
    the processor further executes the one or more computer programs to determine, as the estimation unit for the abnormality threshold, a unit of attribute information similar to attribute information about a vehicle travel environment, and estimate the abnormality threshold used for a range including the attribute information determined as the estimation unit for the abnormality threshold.

13. An abnormality detection system comprising:
    an output device including an output configured to output first driving information representing vehicle behaviors and attribute information representing a travel environment in which vehicles travel, the first driving information being driving information transmitted and received from the vehicles that are traveling; and an abnormality detection apparatus for detecting whether an abnormality is found in the vehicle behaviors based on an abnormality degree indicating a degree of difference between first driving information representing the vehicle behaviors and second driving information obtained when no abnormality is found in the travel environment, the abnormality detection apparatus comprising:

a non-transitory memory storing one or more computer programs; and a processor executing the one or more computer programs to:

estimate an abnormality threshold using an abnormality degree distribution generated from a set of preaccumulated abnormality degrees, the abnormality threshold being an abnormality degree allowing a probability of erroneous determination as to presence or absence of an abnormality to be a predefined probability; and detect whether an abnormality is found in the vehicle behaviors by comparing the abnormality threshold estimated and the abnormality degree for the first driving information.

* * * * *